(12) United States Patent
Dijkstra et al.

(10) Patent No.: US 10,532,929 B2
(45) Date of Patent: Jan. 14, 2020

(54) ENERGY EFFICIENT SULFURIC ACID SYSTEM FOR HUMID ENVIRONMENTS

(71) Applicant: Chemetics Inc., Vancouver (CA)

(72) Inventors: Rene Dijkstra, North Vancouver (CA); Amit Shah, Burnaby (CA)

(73) Assignee: CHEMETICS INC., Vancouver (CA)

(*) Notice: Subject to any disclaimer, the term of this patent is extended or adjusted under 35 U.S.C. 154(b) by 0 days.

(21) Appl. No.: 16/098,818

(22) PCT Filed: Apr. 19, 2017

(86) PCT No.: PCT/US2017/028285
§ 371 (c)(1),
(2) Date: Nov. 2, 2018

(87) PCT Pub. No.: WO2017/192264
PCT Pub. Date: Nov. 9, 2017

(65) Prior Publication Data
US 2019/0202693 A1 Jul. 4, 2019

Related U.S. Application Data

(60) Provisional application No. 62/330,981, filed on May 3, 2016.

(51) Int. Cl.
*B01D 53/26* (2006.01)
*C01B 17/54* (2006.01)
(Continued)

(52) U.S. Cl.
CPC ........ *C01B 17/7655* (2013.01); *B01D 53/263* (2013.01); *C01B 17/54* (2013.01);
(Continued)

(58) Field of Classification Search
CPC ......... C01B 17/69; C01B 17/74; C01B 17/76; C01B 17/80; C01B 17/806
See application file for complete search history.

(56) References Cited

U.S. PATENT DOCUMENTS

| 3,432,263 A | 3/1969 | Ohsol |
| 3,532,471 A * | 10/1970 | Wiklund ................ C01B 17/56 |
| | | 422/161 |

(Continued)

FOREIGN PATENT DOCUMENTS

| CA | 2 802 885 A1 | 4/2013 |
| DE | 29 05 083 A1 | 8/1980 |

(Continued)

OTHER PUBLICATIONS

Composite Tanks & Vessels Pvt. Ltd., "FRP Scrubbing System: Packed Bed FRP Scrubber, Tray Tower, Spray Tower, and Venturi Scrubber," URL=http://www.compositevessel.net/frp-scrubbing-system.html, download date Nov. 1, 2018, 2 pages.

(Continued)

*Primary Examiner* — Timothy C Vanoy
(74) *Attorney, Agent, or Firm* — Seed IP Law Group LLP

(57) ABSTRACT

A contact process, sulfuric acid system and method are disclosed for producing sulphuric acid with improved operating efficiency in humid environments. The system comprises a pre-drying absorber for pre-drying humid air with weak sulfuric acid. Weak sulfuric acid from the pre-drying absorber is provided to a subsystem comprising two sulfur trioxide absorbers and a heat exchanger for the recovery of heat via steam production. This arrangement allows for a marked increase in steam production (i.e. energy efficiency). In a separate improvement, the emission apparatus for the system can be simplified using a peroxide tail gas scrubber comprising upper and lower scrubber sections in which the upper scrubber section consists essentially of tray type scrubbers.

21 Claims, 10 Drawing Sheets

(51) Int. Cl.
*C01B 17/765* (2006.01)
*C01B 17/80* (2006.01)
*F28D 7/00* (2006.01)
*F28F 9/02* (2006.01)

(52) U.S. Cl.
CPC .......... *C01B 17/803* (2013.01); *C01B 17/806* (2013.01); *F28D 7/0008* (2013.01); *F28F 9/02* (2013.01)

(56) References Cited

U.S. PATENT DOCUMENTS

| | | | |
|---|---|---|---|
| 3,760,061 A | 9/1973 | Hammond | |
| 4,213,958 A * | 7/1980 | Cameron | C01B 17/765 423/522 |
| 4,333,917 A * | 6/1982 | Dorr | C01B 17/56 203/12 |
| 4,576,813 A | 3/1986 | McAlister et al. | |
| 5,683,670 A * | 11/1997 | Peng | B01D 53/1418 423/522 |
| 5,800,788 A | 9/1998 | Dourén | |
| 7,820,134 B2 | 10/2010 | Daum et al. | |
| 2008/0199379 A1 | 8/2008 | Bogenstatter et al. | |

FOREIGN PATENT DOCUMENTS

| | | |
|---|---|---|
| DE | 10 2004 012 293 A1 | 9/2005 |
| GB | 1152385 A | 5/1969 |
| WO | 03/037790 A2 | 5/2003 |

OTHER PUBLICATIONS

DKL Engineering, Inc., "Strong Acid System—Towers," Feb. 5, 2003, URL=http://www.sulphuric-acid.com/techmanual/strong%20acid/sa_towers.htm, download date Oct. 29, 2018, 2 pages.

Louie, *Handbook of Sulphuric Acid Manufacturing*, DKL Engineering, Inc., Thornhill, Ontario, Canada, 2005, "Bolkem Process—Thiosulphate Process," pp. 2-74 and 2-75.

Louie, *Handbook of Sulphuric Acid Manufacturing*, DKL Engineering, Inc., Thornhill, Ontario, Canada, 2005, "Petersen-Fattinger-Process," p. 12-12.

Louie, "Sulphuric Acid Plant Fundamentals: Sulphuric Acid Short Course," in *Conference of Metallurgists*, Vancouver, Canada, Oct. 3-6, 2010, 48 pages.

* cited by examiner

ENERGY EFFICIENT SULFURIC ACID SYSTEM FOR HUMID ENVIRONMENTS

TECHNICAL FIELD

The present invention pertains to energy efficient systems for producing sulphuric acid. In particular, it pertains to sulfuric acid systems with improved operating efficiency in humid environments.

BACKGROUND

Sulfuric acid is one of the most produced commodity chemicals in the world and is widely used in the chemical industry and commercial products. Generally, production methods involve converting sulphur dioxide first to sulphur trioxide which is then later converted to sulphuric acid. In 1831, P. Phillips developed the contact process which is used to produce most of today's supply of sulphuric acid.

The basics of the contact process involve obtaining a supply of sulphur dioxide (e.g. commonly obtained by burning sulphur or by roasting sulphide minerals) and then oxidizing the sulphur dioxide with oxygen in the presence of a catalyst (typically vanadium oxide) to accelerate the reaction in order to produce sulphur trioxide. The reaction is reversible and exothermic and it is important to appropriately control the temperature of the gases over the catalyst in order to achieve the desired conversion without damaging the contact apparatus which comprises the catalyst.

Then, the produced sulphur trioxide is absorbed into a concentrated sulphuric acid solution to form a higher strength sulfuric acid solution, which is then diluted with water to return the higher strength solution to the original concentration. This avoids the consequences of directly dissolving sulphur trioxide into water which is a highly exothermic reaction.

While the fundamentals of the contact process are relatively simple, it is desirable to maximize the conversion of sulfur dioxide into sulphuric acid and to minimize the emissions of unconverted sulfur dioxide. Thus, modern plants for producing sulphuric acid often involve multiple contact stages and absorption stages to improve conversion and absorption. Further, the plants often involve complex heat exchanger arrangements to improve energy efficiency. While single contact single absorption (SCSA) systems remain in use, more complex double contact double absorption (DCDA) systems are often employed in order to achieve the ever increasing requirements for higher conversion efficiency and reduced emissions. In a DCDA system, process gases are subjected to two contact and absorption stages in series, (i.e. a first catalytic conversion and subsequent absorption step followed by a second catalytic conversion and absorption step). Details regarding the conventional options available and preferences for sulphuric acid production and the contact process are well known and can be found for instance in "Handbook of Sulfuric Acid Manufacturing", Douglas Louie, ISBN 0-9738992-0-4, 2005, published by DKL Engineering, Inc., Ontario, Canada.

It is also desirable to minimize the energy requirement in the industrial production of sulphuric acid. In the numerous processes involved, there are substantial sources and requirements for heat. Energy efficiency can desirably be improved with the use of complex heat exchanger arrangements to maximize energy recovery.

In U.S. Pat. No. 4,576,813, a method and apparatus was disclosed for significantly improving the efficiency of sulfuric acid plants. A heat recovery system raised the temperature at which the absorption of sulphur trioxide took place in the intermediate adsorption stage. By operating at these higher temperatures, the heat of absorption and dilution could be used to generate useful steam instead of rejecting the heat to a cooling tower. Overall efficiency could thus be substantially improved. In the apparatus, the conventional intermediate absorption tower was replaced with a two-stage absorbing tower, a recirculating pump, a heat exchanger, and a boiler. The two-stage absorbing tower comprises two packed beds in series within the same absorption tower. A disadvantage of this approach however was that, in the event a problem occurred with the heat recovery subsystem during operation, the entire plant may now need to be shutdown for repair.

In WO2003037790, sulfuric acid plants are disclosed that employ a similar heat recovery method but different apparatus to implement it. In this system, a combined quench venturi and packed bed absorber is employed for the intermediate absorption stage instead of a single, two-stage absorption tower. An advantage of this approach is that the quench venturi and heat exchanger subsystem can be bypassed in the event of a problem during operation. This allows the remaining packed bed absorber to operate as a conventional intermediate absorption tower (without improved heat recovery of course) and thus the sulphuric acid plant can at least continue to operate in the event of a problem with the heat recovery subsystem. A disadvantage of using a quench venturi however is that significant energy is required to operate it and provide the pressure drop therein.

Yet another approach for obtaining similar heat recovery in a sulfuric acid plant was disclosed in CA2802885. The energy efficient system therein employed an intermediate absorption subsystem comprising a spray tower, an energy recovery subsystem comprising a pump and a heat exchanger, and an intermediate absorption tower comprising a packed bed. In this system, the spray tower preferably has multiple spray levels which allow for an increase in the absorption of $SO_3$ since each level of spray nozzles provides the same driving force for absorption (since the absorbing acid temperature and concentration is essentially the same at each level). This compares favorably to use of a packed tower or a quench venturi scrubber where $SO_3$ absorption is diminished as the gas stream travels through the apparatus due to increasing absorbing acid temperature and concentration at the latter stages of absorption. Further, the system can operate in a conventional mode when the energy recovery system is not operational (by bypassing the spray tower and energy recovery subsystem or by simply turning off the energy recovery subsystem pump). Further still, the system offers the advantage of a low pressure drop requirement in the spray tower and thus requires less energy than a quench venturi apparatus.

When recovering heat in any of the aforementioned sulfuric acid plants, the water balance in the plant is of great importance since the "hot" absorber and the "cold" absorber subsystems each have to maintain precise sulfuric acid concentrations. Typically, water is added to the "cold" absorption circuit in the form of moisture contained in the ambient air provided to the conventional drying tower and, if this is not sufficient, dilution water is added to the pump tank for the absorber. For the "hot" absorption circuit, only dilution water is added. This approach works well for ambient air humidities up to approximately 1.5 vol % water in a DCDA system or up to approximately 1.0 vol % water in a SCSA system. However, when the water level in the ambient air exceeds this threshold, then there is too much water flowing into the "cold" absorber circuit, which causes the sulfuric acid product concentration to drop below the desired strength. In order to maintain a proper water balance, one approach is to move water and acid from the "cold" absorption system (which operates at a lower concentration) to the "hot" absorption circuit. However, this results in the "hot" absorption circuit being cooled by the acid from the "cold" absorption system and hence the steam production of the system is undesirably reduced.

To address this issue, DE102004012293 suggests an alternative approach in which a partial stream of $SO_3$ is bypassed around the "hot" absorption system. In the disclosed process here, $SO_3$ is introduced into a first absorption stage (primary absorber) and absorbed there at a temperature>140° C. in concentrated sulfuric acid. The sulfuric acid having a higher concentration due to the absorption is passed through a heat exchanger and cooled, and the non-absorbed $SO_3$ is supplied to a second absorption stage (secondary absorber) for further absorption in sulfuric acid. Before the first absorption stage, a partial stream of $SO_3$ is branched off and supplied directly to another absorption stage (e.g. a secondary absorber). Air is dried in a drying tower by means of sulfuric acid, and the drying tower is operated with the same sulfuric acid concentration as the absorber. Using this approach though, less $SO_3$ gas is available for absorption in the "hot" absorber and consequently steam production is again reduced.

Another approach to mitigate the reduction in steam production when faced with high ambient air humidities is to operate the drying tower at a reduced sulfuric acid concentration (e.g. 96 wt %) which thus reduces the amount of acid that has to be transferred within the system. However, this approach requires the use of a separate sulfuric acid circuit for the drying tower which is operated at lower temperature, thereby leading to reduced energy recovery in the main boiler. And, for plants with emission requirements below approximately 200 ppm $SO_2$, this approach will also require a separate sulfuric acid circuit for final absorption. Even using such an approach, the lowest sulfuric acid concentration which can practically be utilized without impacting the drying performance of the drying tower system within a typical sulfuric acid plant is about 94 wt % acid. Thus without yet further apparatus and process steps, this sets a practical lower limit on the sulfuric acid concentration provided to the drying tower and hence to how much the reduction in steam production can be mitigated in this way.

Consideration may also be given to pre-drying the ambient air via some other method in order to lower the moisture level before entering the drying tower of the sulfuric acid system. For instance, the incoming ambient air might be cooled first to remove the excessive moisture. However, this requires temperatures of about or below 10° C. and thus expensive, uneconomical cooling equipment would be required.

There is an increasing demand for sulfuric acid systems in geographical locations in which high humidity conditions are frequently encountered. And there remains a desire to obtain yet further improvements in energy efficiency in such systems. The present invention addresses this desire and provides other benefits as disclosed below.

SUMMARY

In the present invention, contact process, sulfuric acid systems and methods are disclosed for producing sulphuric acid with improved operating efficiency in humid environments. The systems comprise a pre-drying absorber for pre-drying humid air with weak sulfuric acid. Weak sulfuric acid from the pre-drying absorber is provided to a heat recovery subsystem comprising two sulfur trioxide absorbers and a heat exchanger in which heat is recovered via steam production. Steam production, and hence energy efficiency can be substantially increased over other alternative approaches.

Specifically, the contact process, sulfuric acid system is for producing sulfuric acid from sulfur and comprises a pre-drying absorber, a drying absorber, a sulfur furnace, a sulfur dioxide-to-sulfur trioxide converter, and a two-stage sulfur trioxide absorption subsystem. The pre-drying absorber comprises a gas inlet, a gas outlet, a liquid inlet, and a liquid outlet. The gas inlet is connected to ambient air, typically via a filter and pump. The drying absorber comprises a gas inlet connected to the gas outlet of the pre-drying absorber, a gas outlet, a liquid inlet, and a liquid outlet. The sulfur furnace comprises a gas inlet connected to the gas outlet of the drying absorber, and a gas outlet. The sulfur dioxide-to-sulfur trioxide converter comprises a series of contact catalyst beds, a gas inlet connected to the gas outlet of the sulfur furnace, and a gas outlet. The two-stage sulfur trioxide absorption subsystem comprises a $1^{st}$ sulfur trioxide absorber, a $2^{nd}$ sulfur trioxide absorber, and a heat exchanger. In the subsystem, the $1^{st}$ sulfur trioxide absorber comprises a gas inlet connected to the gas outlet of the converter, a gas outlet, a liquid inlet, a liquid outlet for product sulfuric acid, and a liquid circuit for circulating sulfuric acid within the $1^{st}$ absorber. The $2^{nd}$ sulfur trioxide absorber comprises a gas inlet connected to the gas outlet of the $1^{st}$ sulfur trioxide absorber, a gas outlet, a liquid inlet, a liquid outlet for product sulfuric acid and a liquid circuit for circulating sulfuric acid within the $2^{nd}$ absorber. And the heat exchanger comprises a first liquid side and a $2^{nd}$ liquid side in thermal contact with each other, in which the first liquid side is connected in series within the liquid circuit of the $1^{st}$ sulfur trioxide absorber, and the second liquid side comprises an inlet connected to a supply of feed water in the sulfuric acid system and an outlet for steam. In order to provide weak sulfuric acid from the pre-drying absorber to the subsystem, the liquid inlet of the $1^{st}$ sulfur trioxide absorber is connected to the liquid outlet of the pre-drying absorber.

In an exemplary embodiment, the liquid inlet of the pre-drying absorber is connected to a supply of sulfuric acid, preferably from the $2^{nd}$ sulfur trioxide absorber.

With regards to the various absorbers in the system, the pre-drying absorber, for instance, can be a packed bed absorption tower. The $1^{st}$ sulfur trioxide absorber can be selected from the group consisting of an open spray tower, a venturi absorber, and a packed bed absorption tower. The $2^{nd}$ sulfur trioxide absorber can be a packed bed absorption tower.

The sulfuric acid system may desirably comprise a common acid tank in which the liquid outlet for product sulfuric acid from the $1^{st}$ sulfur trioxide absorber is connected to a $1^{st}$ inlet in the common acid tank, the liquid outlet for product sulfuric acid from the $2^{nd}$ sulfur trioxide absorber is connected to a $2^{nd}$ inlet in the common acid tank, the liquid outlet from the drying absorber is connected to a $3^{rd}$ inlet in the common acid tank, and the liquid inlet of the pre-drying absorber is connected to an outlet in the common acid tank.

In another exemplary embodiment, the liquid inlet of the $1^{st}$ sulfur trioxide absorber in the system is additionally connected to a supply of dilution water.

The present invention is particularly suitable for use in single contact, single absorption sulfuric acid production systems and the preceding describes component elements required for such systems. However, the invention is also suitable for use in double contact, double absorption systems which comprise an additional contact catalyst bed and an additional sulfur trioxide absorber.

In a separate improvement, the sulfuric acid system can also comprise a simplified peroxide tail gas scrubber to acceptably deal with plant emissions. The improved peroxide tail gas scrubber comprises a lower packed bed scrubber section and an upper scrubber section in which the upper scrubber section consists essentially of tray type scrubbers.

The associated method for energy efficient production of sulfuric acid using the aforementioned sulfuric acid system comprises the following steps:

pre-drying ambient air in the pre-drying absorber with weak sulfuric acid having a concentration of less than 90% by weight, drying the pre-dried ambient air in the drying absorber with sulfuric acid, oxidizing sulfur with the dried, pre-dried ambient air in the sulfur furnace, thereby producing a gas stream comprising sulfur dioxide, converting the sulfur dioxide in the gas stream to sulfur trioxide in the converter, providing the weak sulfuric acid from the pre-drying absorber to the liquid inlet of the sulfur trioxide absorber, thereby diluting sulfuric acid in the $1^{st}$ sulfur trioxide absorber with the provided weak sulfuric acid, absorbing sulfur trioxide from the gas stream from the converter in sulfuric acid in the sulfur trioxide absorber, thereby producing heated product sulfuric acid, exchanging heat from the heated product sulfuric acid in the first liquid side of the heat exchanger to feed water supplied to the inlet of the second liquid side of the heat exchanger, thereby producing steam, absorbing sulfur trioxide remaining in the gas stream from the $1^{st}$ sulfur trioxide absorber in the $2^{nd}$ sulfur trioxide absorber, thereby producing product sulfuric acid, and exhausting the gas stream from the sulfuric acid system.

The method is particularly suitable for use in humid environments in which the water concentration in the ambient air is greater than 1.0 vol % (e.g. in a SCSA system) or greater than 1.5 vol % (e.g. in a DCDA system).

In exemplary methods, the weak sulfuric acid in the pre-drying absorber has a concentration of less than or about 70%, and the temperature of the weak sulfuric acid in the pre-drying absorber is less than about 70° C., e.g. is about 50° C. The sulfuric acid provided to the pre-drying absorber has a higher concentration, e.g. greater than 94%.

Further, in typical embodiments, the concentration of heated product sulfuric acid in the $1^{st}$ sulfur trioxide absorber and the concentration of the product sulfuric acid in the $2^{nd}$ sulfur trioxide absorber are both greater than 98%.

In embodiments comprising a common acid tank, heated product sulfuric acid from the $1^{st}$ sulfur trioxide absorber and product sulfuric acid from the $2^{nd}$ sulfur trioxide absorber are directed to the common acid tank. The heated product sulfuric acid from the $1^{st}$ sulfur trioxide absorber is directed thereto after production of steam and after passing through the associated hardware (i.e. indirectly). The sulfuric acid in the common acid tank typically has a concentration of greater than 98%.

Desirably, embodiments of the invention can be expected to increase the relative steam production in the sulfuric acid system by from about 5 to 30%.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and are not limited to just one.

In a numerical context, the word "about" is to be construed as meaning plus or minus 10%.

As discussed above, in a typical contact process, sulfuric acid system equipped with an energy recovery subsystem, the production of steam and hence energy efficiency is undesirably reduced when operating in very humid ambient conditions. In the present invention, the excessive water in the ambient air is removed via absorption in weak sulfuric acid (i.e. acid at a lower concentration acid than elsewhere in the system) in a pre-drying absorber. The still weak acid formed in this pre-drying step is then used as part of the dilution water supplied to the energy recovery subsystem in the "hot" absorber circuit of the system. The concentration difference between this weak acid and the acid in the "hot" absorber circuit is much larger than can be obtained in conventional systems and consequently steam production can be significantly improved. Further, control of the "hot" absorber circuit can be achieved independent of ambient conditions. Due to the relatively low concentration and temperature of the acid used, the pre-drying absorber and associated subsystem can be constructed using more cost effective materials, such as fibre-reinforced plastic and polypropylene, thus improving the system economics. Advantageously then, the invention provides for improved steam production, lower plant cost, and improved control.

Figure 1:
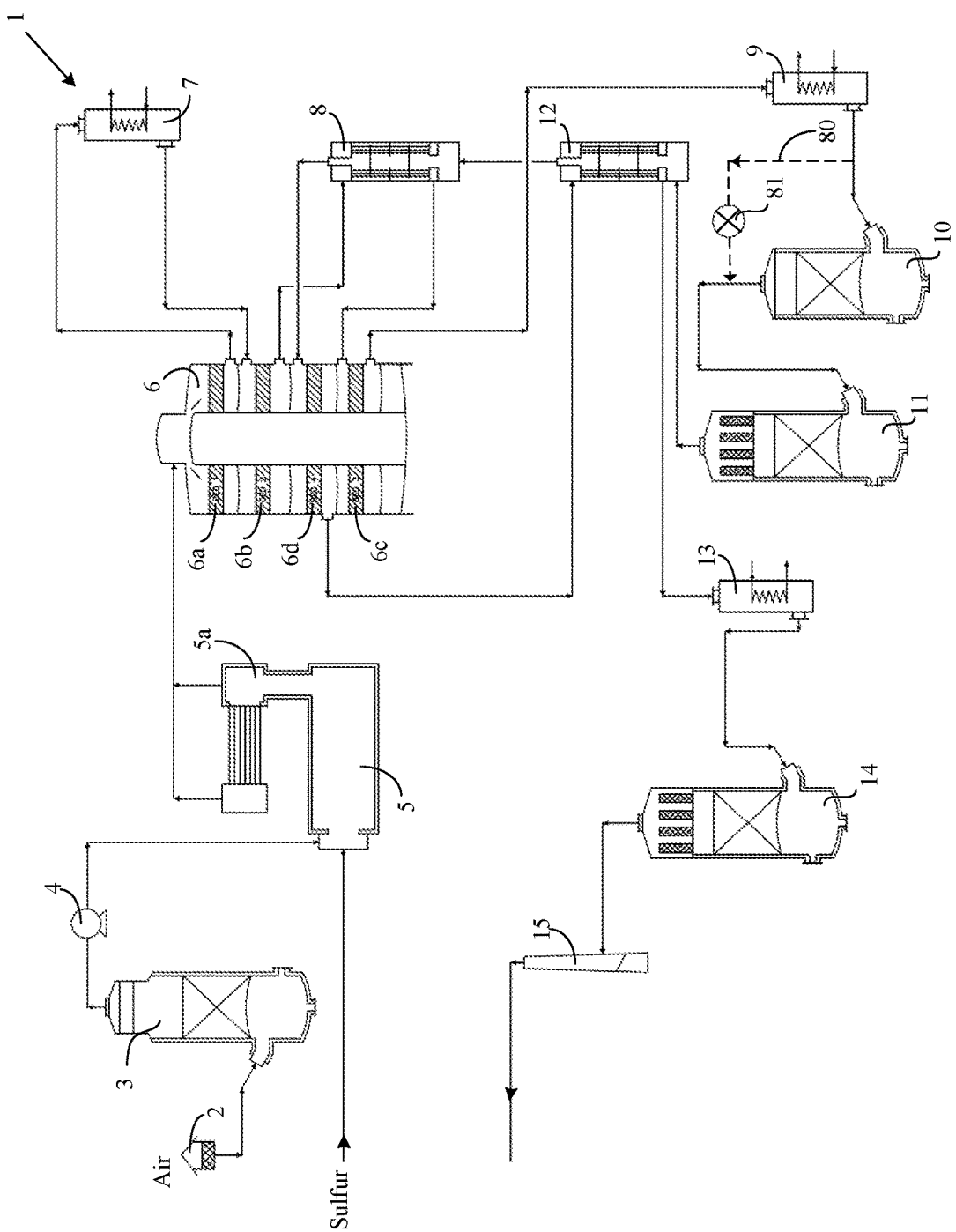
FIG. 1 shows a schematic of the gas related circuit of a prior art double contact double absorption (DCDA) system for producing sulphuric acid in which the system comprises a two-stage trioxide absorption subsystem where energy is recovered via production of steam.
Figure 2:
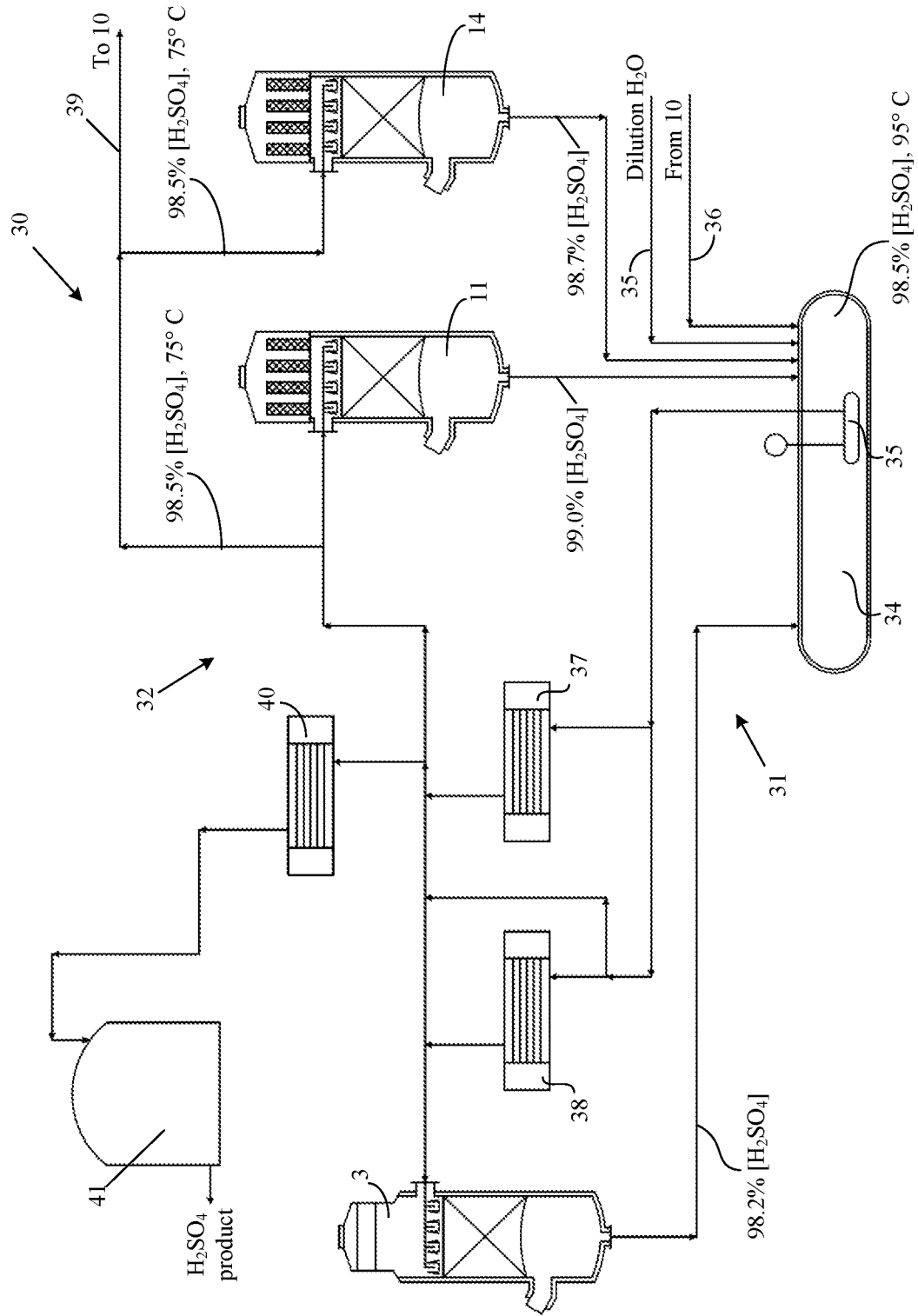
FIG. 2 shows a schematic of the main portion of the liquid related circuit of the prior art DCDA system of FIG. 1.
Figure 3:
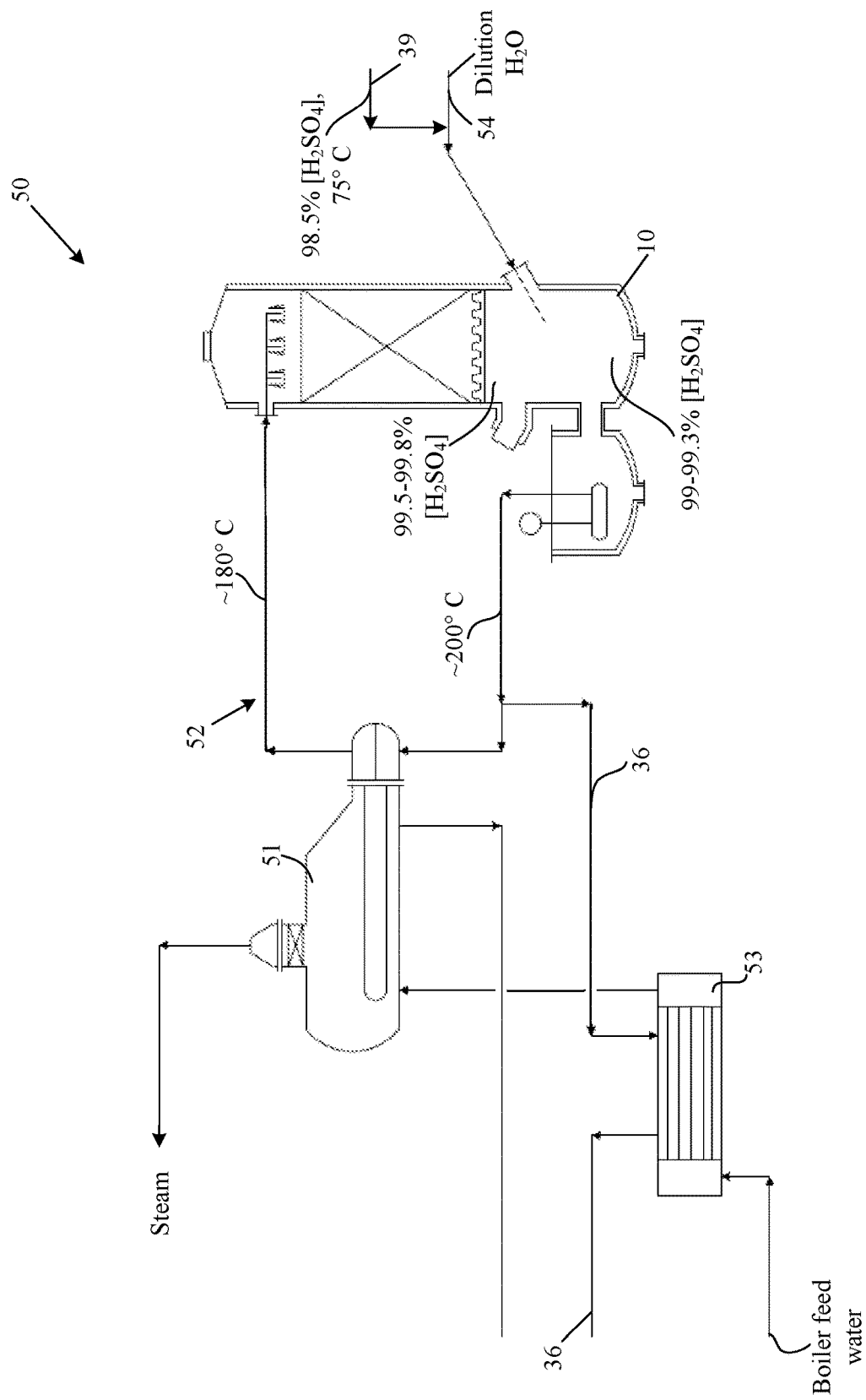
FIG. 3 shows a schematic of the steam production portion of the liquid related circuit of the prior art DCDA system of FIG. 1.
Figure 4:
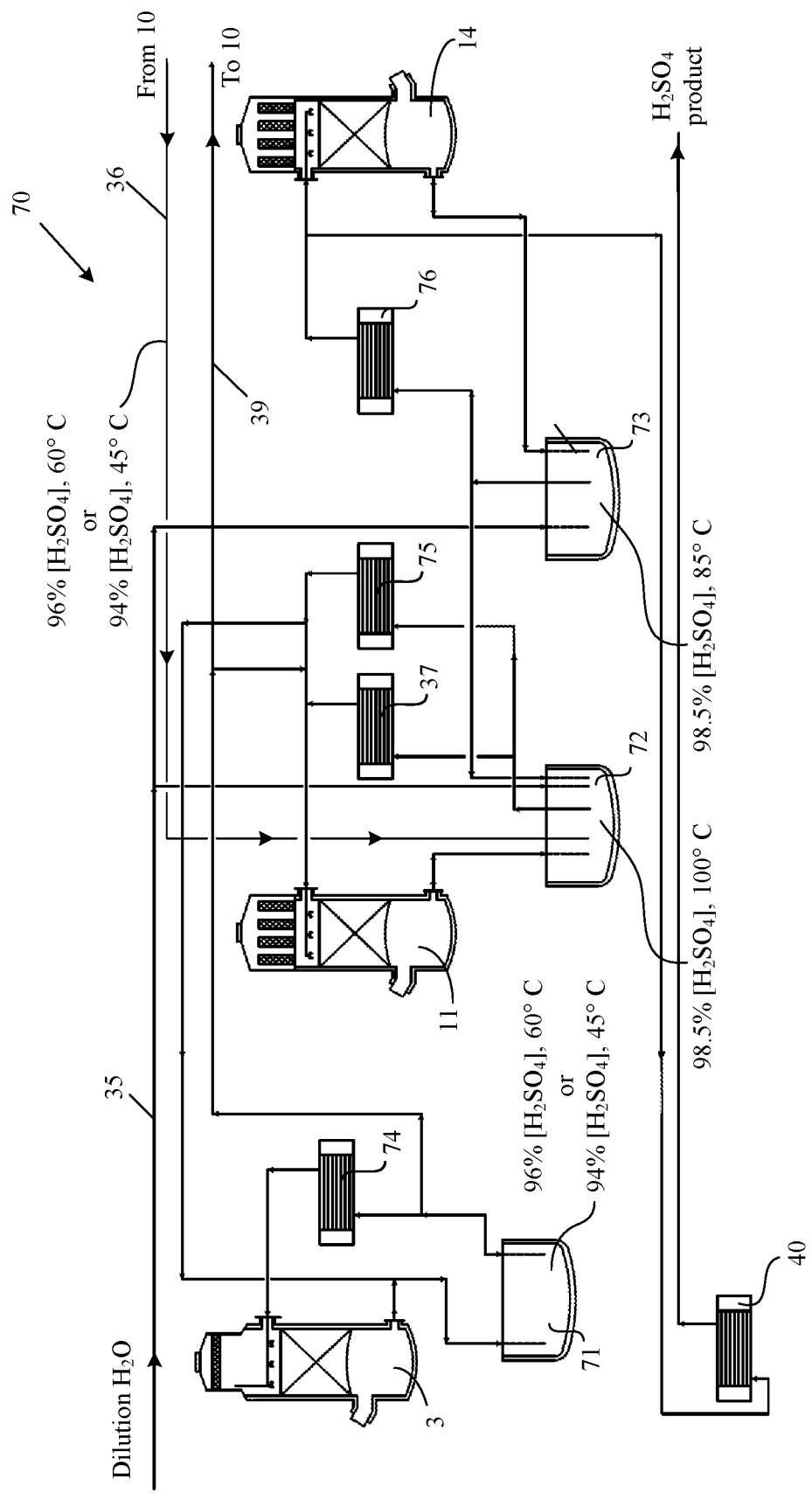
FIG. 4 shows a schematic of the main portion of a more complex liquid related circuit of a prior art DCDA system similar to that of FIG. 1 except that the system comprises multiple acid tanks and is configured to employ lower concentration acid crossflows.

The following figures show schematics of various double contact double absorption (DCDA) systems for producing sulphuric acid in which the systems comprise a two-stage sulfur trioxide absorption subsystem for purposes of recovering energy via production of steam. In FIGS. 1-3, the gas and liquid related circuits for a desirable prior art system employing a common acid tank are initially illustrated. The next FIG. 4 illustrates the differences (essentially in the main portion of the liquid related circuit) between that prior art system and a more complex prior art system comprising multiple acid tanks which is configured to use lower concentration acid crossflows. FIGS. 5-8 then show the gas and liquid related circuits for a similar DCDA system, but which comprises a pre-drying absorber and is configured in accordance with the invention.

In all these figures, in order to avoid clutter, many of the conventional inlets, outlets, and fluid lines found in prior art systems have not been called out. Instead in these instances, a given fluid line, along with the inlet and the outlet associated therewith, can be determined based on those components in the system that the fluid line interconnects. The direction of fluid flow in a fluid line is indicated by appropriate arrows. Further, certain conventional, but necessary, elements such as pumps, valves, sumps, and the like have been omitted. Those skilled in the art are expected to readily appreciate where such elements would be required and located.

FIG. 1 shows a schematic of the gas related circuit of a prior art DCDA system in which the system comprises a two-stage trioxide absorption subsystem for energy recovery and a common acid tank. In gas related circuit 1, ambient air is drawn in through filter 2 by blower 4 and into the gas inlet of drying absorber 3 (shown here as a packed bed absorption tower). Water is removed from the ambient air via absorption in "cold" acid obtained from the liquid related circuit (not shown here but appearing in FIG. 2). Dried ambient air is then directed from the gas outlet of drying absorber 3 by blower 4 to the gas inlet of sulfur furnace 5. Sulfur is additionally provided to sulfur furnace 5 and reacted (burned) with the dried ambient air to produce a gas stream comprising air and sulfur dioxide, $SO_2$. As shown in FIG. 1, the $SO_2$/air gas stream then passes through boiler 5a. The $SO_2$/air gas stream is directed through boiler 5a to create steam and to lower the temperature of the gas stream in order to create a $SO_2$/air gas stream product at an appropriate temperature for conversion.

The $SO_2$/air gas stream is then directed to the gas inlet of $SO_2$-to-$SO_3$ converter 6 which comprises four contact catalyst beds 6a to 6d which are arranged in series (by flow) to convert the $SO_2$ to $SO_3$ in stages. Between each conversion stage, a heat exchange step is performed to remove the substantial heat generated by the conversion and thereby to keep the gas stream at an acceptable temperature for conversion and prevent damage to the catalyst beds and hardware. As shown, the $SO_2$/air gas stream initially passes through catalyst bed 6a where a first stage conversion occurs. The heated gas stream is then directed through heat exchanger 7 in which heat is exchanged with a water supply to produce useful steam for the system. The gas stream is then passed through catalyst bed 6b where a second stage conversion occurs. The heated gas stream is then directed to heat exchanger 8 (shown here as a shell-and-tube type heat exchanger) in which heat is exchanged with gas stream from further along the gas related circuit of the DCDA. The gas stream is then passed through catalyst bed 6c where a third stage conversion occurs. (Note that catalyst bed 6c is physically located at the end of converter 6.) The heated gas stream is next directed through heat exchanger 9 in which heat is once again exchanged with a water supply to produce useful steam for the system. From here, the partially converted gas stream undergoes an intermediate absorption to form sulfuric acid. A two-stage sulfur trioxide, $SO_3$, absorption subsystem is employed for this purpose and is designed not only for $SO_3$ absorption but also for efficient recovery of heat via production of steam.

In the system of FIG. 1, the two-stage $SO_3$ absorption subsystem comprises $1^{st}$ $SO_3$ absorber 10 (shown here as a packed bed absorption tower), $2^{nd}$ $SO_3$ absorber 11 (also shown here as a packed bed absorption tower), and an associated heat exchanger for steam production. (This heat exchanger is not part of the gas related circuit and thus does not appear in FIG. 1. Instead it appears later in FIG. 3.) The partially converted gas stream from heat exchanger 9 (which originated from the gas outlet from catalyst bed 6c in converter 6) is supplied to the gas inlet of $1^{st}$ $SO_3$ absorber 10. In $1^{st}$ $SO_3$ absorber 10, $SO_3$ in the gas stream is absorbed by acid obtained from the liquid related circuit (not shown here but appearing in FIG. 3). After this first absorption stage, the gas stream is directed from the gas outlet of $1^{st}$ $SO_3$ absorber 10 to the gas inlet of $2^{nd}$ $SO_3$ absorber 11 for the second absorption stage takes place. Again $SO_3$ in the gas stream is absorbed by "cold" acid obtained from the liquid related circuit (not shown here but appearing in FIG. 2).

After this intermediate absorption, the gas stream exits the gas outlet of $2^{nd}$ $SO_3$ absorber 11 and serves as a cooling fluid supply for cold reheat exchanger 12 (which is used to exchange heat with the gas stream obtained from catalyst bed 6d further along the gas related circuit). After passing through cold reheat exchanger 12, the now reheated gas stream is then directed to and reheated further in heat exchanger 8 (which is used to exchange heat with the gas stream obtained from catalyst bed 6b earlier in the gas related circuit). The further reheated gas stream is then returned once again to converter 6 and passed through catalyst bed 6d where a fourth and final stage conversion occurs. (Note that catalyst bed 6d is physically located between catalyst beds 6b and 6c in converter 6.) The heated, converted gas stream obtained from the gas outlet from catalyst bed 6d in converter 6 is then directed to cold reheat exchanger 12, where heat is exchanged with the gas stream exiting the gas outlet of $2^{nd}$ $SO_3$ absorber 11 (earlier in the gas related circuit). From here, the converted gas stream undergoes a final absorption to form sulfuric acid.

The converted gas stream exiting cold reheat exchanger 12 is directed to yet another heat exchanger 13 in which heat is exchanged with a boiler feed water supply to enhance useful steam production for the system. The cooled converted gas stream then is directed to the gas inlet of final $SO_3$ absorber 14. Once again, $SO_3$ in the converted gas stream is absorbed by "cold" acid obtained from the liquid related circuit (not shown here but appearing in FIG. 2). Essentially all the $SO_2$ and $SO_3$ in the gas stream has now been converted and absorbed. Thus, the gas stream is directed to stack 15, which may comprise a scrubber or scrubbers (not shown) to further reduce emissions, for discharge to the atmosphere.

FIG. 2 shows a schematic of the main portion of the liquid related circuit 30 of the DCDA system of FIG. 1. Liquid related circuit 30 is also known as the "cold absorption circuit" in the industry and comprises two subcircuits, namely absorption subcircuit 31 and absorption subcircuit 32, which involve sulfuric acid at temperatures of about 95° C. and 75° C. respectively. Absorption subcircuit 31 includes common acid tank 34 in which concentrated hot acid is commonly stored. Acid of varying concentration (as indicated in FIG. 2) which has been used to absorb water in drying absorber 33 and to absorb $SO_3$ from both $2^{nd}$ $SO_3$ absorber 11 and final $SO_3$ absorber 14 are directed to common acid tank 34. Dilution water 35 and acid 36 from the liquid circuit which circulates sulfuric acid within $1^{st}$ $SO_3$ absorber 10 (not shown in FIG. 2 but appears in FIG. 3) are also directed to common acid tank 34 in order to control the sulfuric acid concentration ($[H_2SO_4]$) in common acid tank 34 to about 98.5%. Acid from common acid tank 34 is pumped (via pump 35) to a pair of heat exchangers, denoted as boiler feed water preheater 37 and acid cooler 38 in FIG. 2. After exchanging heat in these two heat exchangers, the cooled acid joins absorption subcircuit 32. A portion of the acid in absorption subcircuit 32 is provided to drying absorber 3 (to absorb water from the ambient air). Other portions of the acid in absorption subcircuit 32 are provided to $2^{nd}$ $SO_3$ absorber 11 and final $SO_3$ absorber 14 to absorb $SO_3$ from the partially converted and converted gas streams. And yet another portion of the acid 39 in absorption subcircuit 32 is provided to $1^{st}$ $SO_3$ absorber 10 (not shown in FIG. 2 but appears in FIG. 3). Finally though, a portion of the acid 39 in absorption subcircuit 32 is directed to a heat exchanger, denoted as product cooler 40, to be cooled and then stored in product acid tank 41 as product sulfuric acid from the DCDA system.

FIG. 3 shows a schematic of the steam production portion of the liquid related circuit 50 and how it interconnects with the main portion 30 of FIG. 2. Steam production portion of the liquid related circuit 50 is also known as the "hot absorption circuit" in the industry. Steam production portion 50 is part of the two-stage sulfur trioxide absorption subsystem and comprises heat exchanger 51 in which a substantial amount of energy can be recovered in the DCDA system. $1^{st}$ $SO_3$ absorber 10 comprises liquid circuit 52 for circulating sulfuric acid within $1^{st}$ $SO_3$ absorber 10 (to absorb $SO_3$ therein) and within heat exchanger 51 (to exchange heat with boiler feed water supplied to the other side of heat exchanger 51). A substantial amount of heat is generated as $SO_3$ is absorbed in the acid in $1^{st}$ $SO_3$ absorber 10. As shown in FIG. 3, the acid in the base of $1^{st}$ $SO_3$ absorber 10 and in liquid circuit 52 upstream of heat exchanger 51 has a concentration of about 99 to 99.3% $H_2SO_4$ and a temperature of about 200° C. Heat from this acid is exchanged with boiler feed water supplied to the other side of heat exchanger 51. (As shown in FIG. 3, boiler feed water is initially heated by directing through boiler feed water heater 53 where heat is exchanged with outgoing acid 36. The initially heated boiler feed water is then directed to heat exchanger 51 where it is converted to useful steam via heat exchange with acid in liquid circuit 52.) After exchanging a substantial amount of heat in heat exchanger 51, the acid in liquid circuit 52 has cooled substantially to about 180° C. whereupon it is used again to absorb $SO_3$ in $1^{st}$ $SO_3$ absorber 10.

Fresh acid is supplied to $1^{st}$ $SO_3$ absorber 10 as the portion of acid 39 in absorption subcircuit 32. Dilution water 54 is also supplied to $1^{st}$ $SO_3$ absorber 10 as required. Acid 36 is taken from liquid circuit 52 and is directed to common acid tank 34 in order to control the sulfuric acid concentration in common acid tank 34.

As discussed above, the DCDA system works well when air humidities are below about 1.25-1.5 vol % water. In very humid conditions though, to maintain an appropriate a proper water balance in the system, acid from absorption subcircuit 32 is moved to absorption subcircuit 31. Again though, this results in absorption subcircuit 31 being cooled by the acid from absorption subcircuit 32 and consequently steam production from heat exchanger 51 is undesirably reduced. Instead, using the approach disclosed in DE102004012293 above, a partial stream of $SO_3$ can be bypassed around the "hot" absorption circuit. This is accomplished via bypass line 80 around $1^{st}$ $SO_3$ absorber 10 (shown as a dashed line in FIG. 1). The amount of $SO_3$ bypassed is controlled by control valve 81. An improvement in steam production can be obtained in this way, but it is reduced in principle because less $SO_3$ gas is available for absorption in the "hot" $1^{st}$ $SO_3$ absorber 10.

In an alternative prior art approach discussed above, in high humidity conditions, the drying tower can be operated at a reduced sulfuric acid concentration and thus reduce the amount of acid that has to be transferred within the system (i.e. employs lower concentration acid crossflows). However this approach requires the use of a separate sulfuric acid tank and acid circuit for the drying absorber and typically, in order to achieve present day emission requirements, a separate sulfuric acid tank and acid circuit for the final $SO_3$ absorber. The liquid related circuit of the system is thus more complex. For instance, FIG. 4 shows a schematic of the more complex main portion of the liquid related circuit 70 for a typical prior art DCDA system which is configured for this purpose. (Note: The gas related circuit for this DCDA system is the same as that of the system illustrated in FIG. 1. The steam production portion of the liquid related circuit for this DCDA system is similar to that of the system illustrated in FIG. 3, except that here, a lower concentration supply of acid is obtained from elsewhere in the main portion of the liquid related circuit and is supplied to $1^{st}$ $SO_3$ absorber 10 as acid 39.)

In FIG. 4, main portion of the liquid related circuit 70 now comprises multiple acids tanks and related acid circuits for each of drying absorber 3, $2^{nd}$ $SO_3$ absorber 11, and final $SO_3$ absorber 14. (Note: In FIG. 4, the same numerals have been used for those elements common to elements appearing in the preceding Figures.) Thus here, main portion of the liquid related circuit 70 comprises drying absorber tank 71, $2^{nd}$ $SO_3$ absorber tank 72, and final $SO_3$ absorber tank 73 along with several associated additional heat exchangers, namely dry acid cooler 74, inter acid cooler 75, and final acid cooler 76.

The acid concentrations and temperatures differ in each of the tanks 71, 72, and 73. In particular, a lower concentration supply of acid is employed in drying absorber tank 71. This supply of acid is obtained via appropriate combination of acid obtained from $2^{nd}$ $SO_3$ absorber tank 72 (after exchanging heat in boiler feed water preheater 37 and acid cooler 75) and water absorbed from the air in drying absorber 3. This acid may for instance have a concentration of from 94-98% $H_2SO_4$ and a temperature of about 40-70° C. The lowest practical sulfuric acid concentration which can be obtained and employed here is about 94 wt % acid at a temperature of about 40° C. (because otherwise the drying function may be compromised). Elsewhere in the system, the acid is more concentrated and hotter. The acid in $2^{nd}$ $SO_3$ absorber tank 72 would typically have a concentration of about 98.5% $H_2SO_4$ and a temperature of about 100° C. The acid in final $SO_3$ absorber tank 73 would typically have a concentration of about 98.5% $H_2SO_4$ and a temperature of about 85° C.

In the system of FIG. 4, lower concentration, colder acid from drying absorber tank 71 is used as the portion of acid 39 to be transferred to $1^{st}$ $SO_3$ absorber 10. And acid 36 from the liquid circuit which circulates sulfuric acid within $1^{st}$ $SO_3$ absorber 10 is now directed to $2^{nd}$ $SO_3$ absorber tank 72. Advantageously here, a lesser amount of the weaker, colder acid 39 needs to be transferred than is required in the system depicted in FIGS. 1 to 3. Again though, this advantage is offset by the additional complexity involved with the need for multiple acids tanks and related acid circuits in the system.

Figure 5:
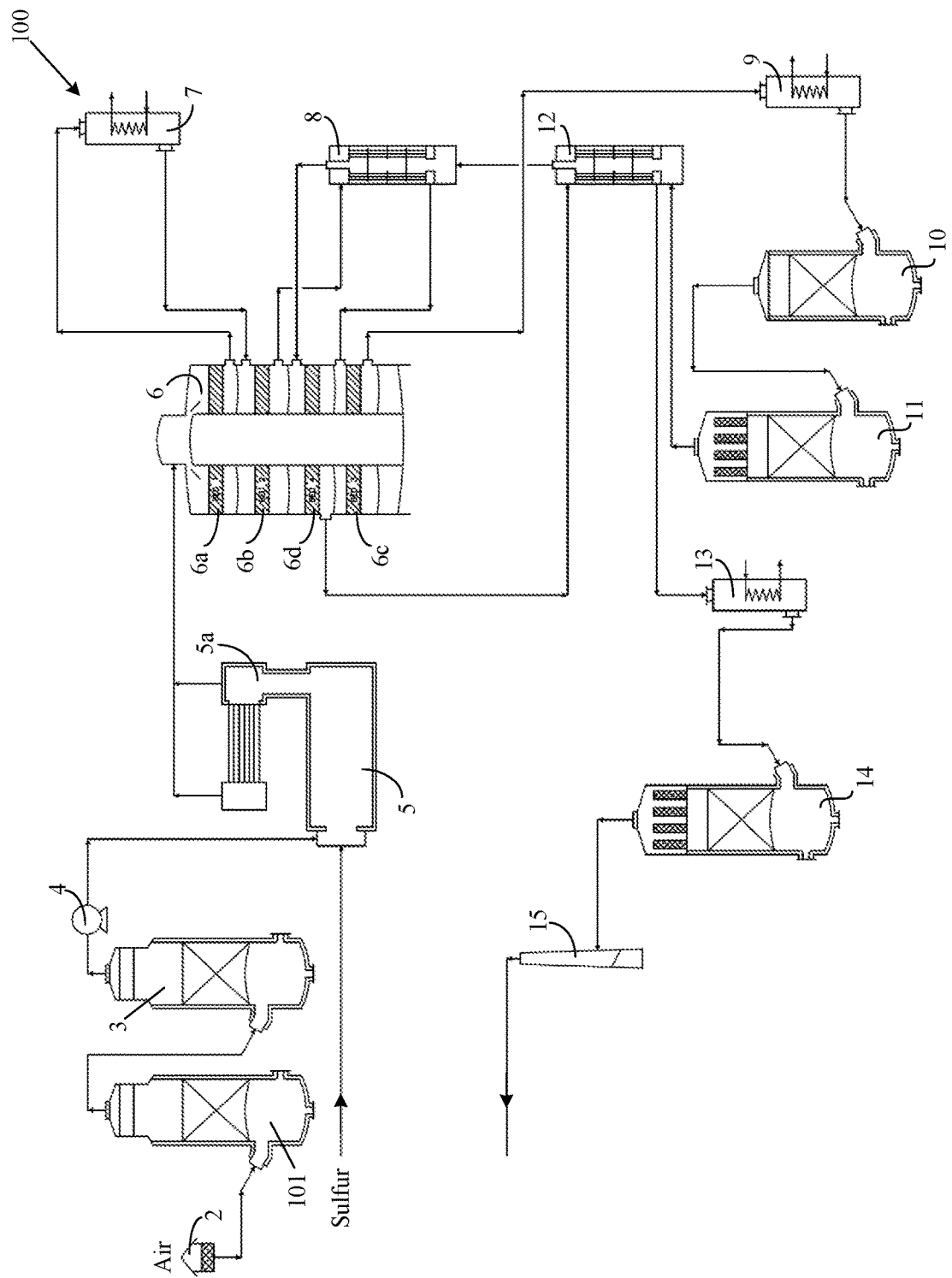
FIG. 5 shows a schematic of the gas related circuit of a DCDA system of the invention which is similar to that of FIG. 1 except that the system comprises a pre-drying absorber and is configured in accordance with the invention.

FIGS. 5 to 8 now illustrate schematics of an exemplary DCDA system of the invention which is similar to that of FIGS. 1 to 3 except that the system comprises a pre-drying absorber and is configured in accordance with the invention. FIG. 5 shows a schematic of gas related circuit 101 which comprises pre-drying absorber 101 connected between air filter 2 and drying absorber 3. Except for additional pre-drying absorber 101, gas related circuit 101 is identical to prior art gas related circuit 1 in FIG. 1.

Figure 6:
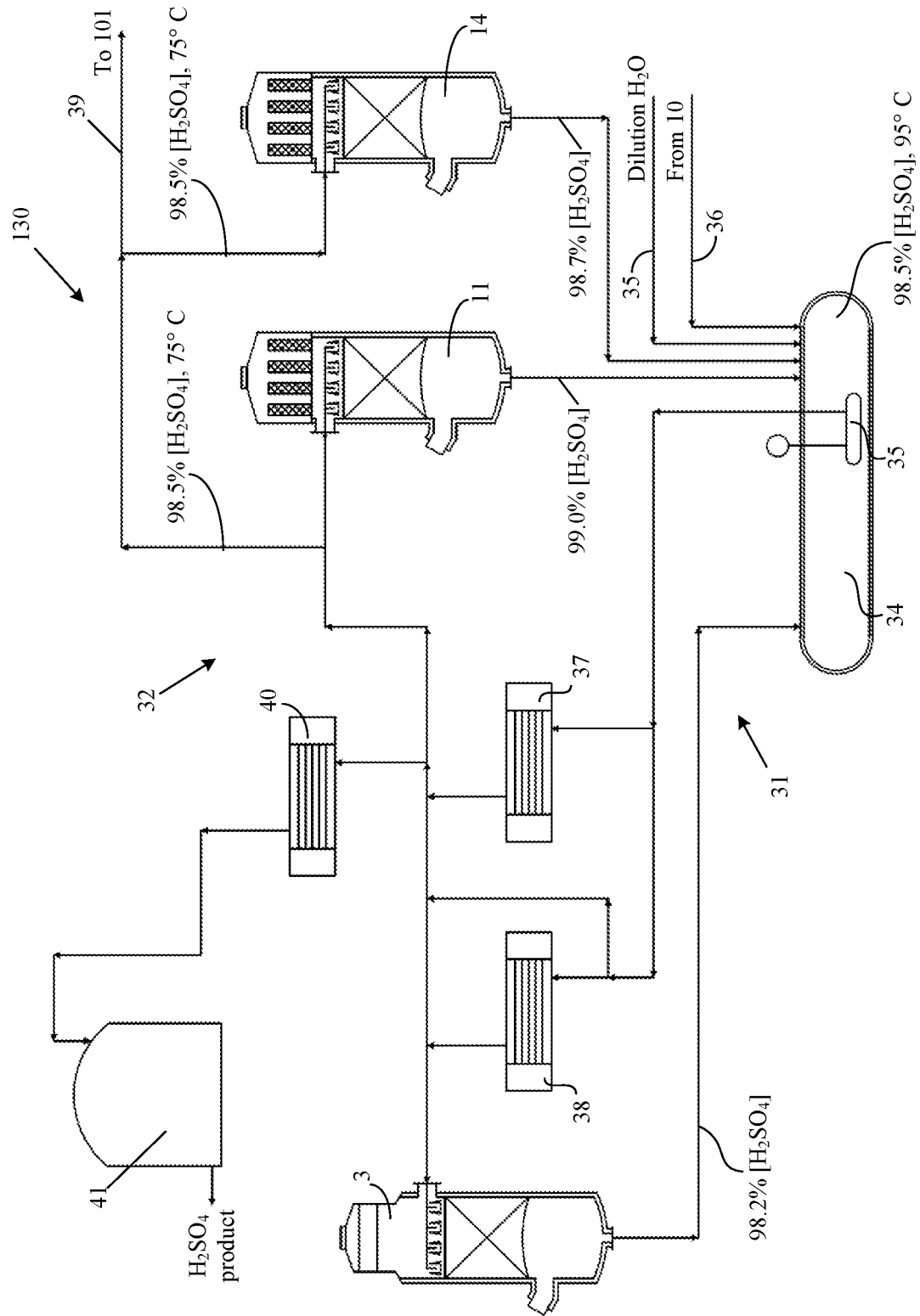
FIG. 6 shows a schematic of the main portion of the liquid related circuit of the DCDA system of FIG. 5.

FIG. 6 shows a schematic of the main portion of the liquid related circuit 130 of the DCDA system of FIG. 5 in which the portion of acid 39 is directed to pre-drying absorber 101 (instead of to $1^{st}$ $SO_3$ absorber 10). Except for this configuration difference of acid 39, main portion of the liquid related circuit 130 is identical to prior art main portion of the liquid related circuit 30 in FIG. 2.

Figure 7:
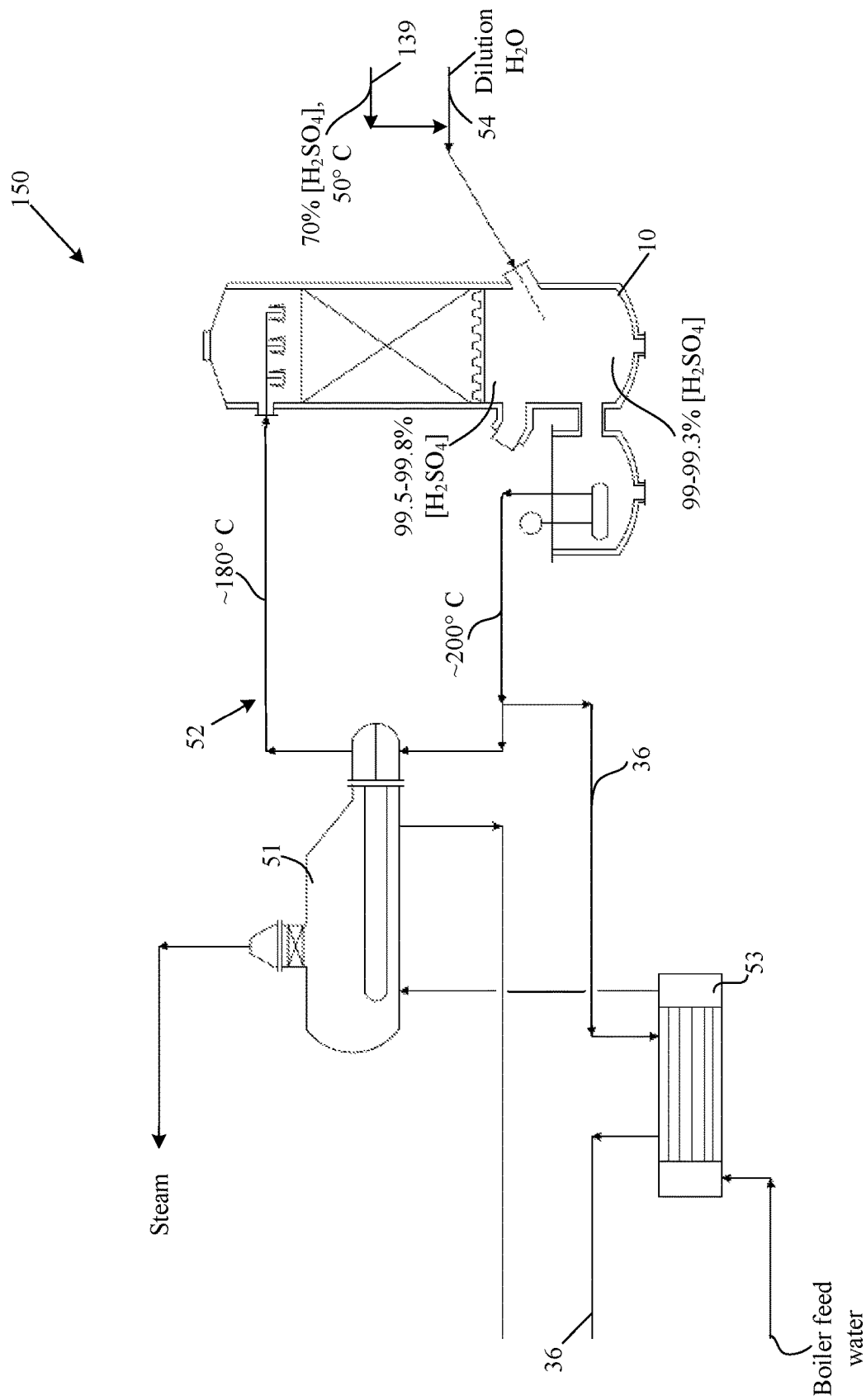
FIG. 7 shows a schematic of the steam production portion of the liquid related circuit of the DCDA system of FIG. 5.

FIG. 7 shows a schematic of the steam production portion of the liquid related circuit 150 of the DCDA system of FIG. 5 in which acid 139 from pre-drying absorber 101 is provided (instead of acid 39) to $1^{st}$ $SO_3$ absorber 10. (Pre-drying absorber 101 appears in FIG. 8 and is not shown in FIG. 7.) Except for this configuration difference of what acid is provided to $1^{st}$ $SO_3$ absorber 10, steam portion of the liquid related circuit 150 is identical to prior art steam portion of the liquid related circuit 50 in FIG. 3. As shown here, acid 139 has a concentration of about 70% $H_2SO_4$ and a temperature of about 50° C.

Figure 8:
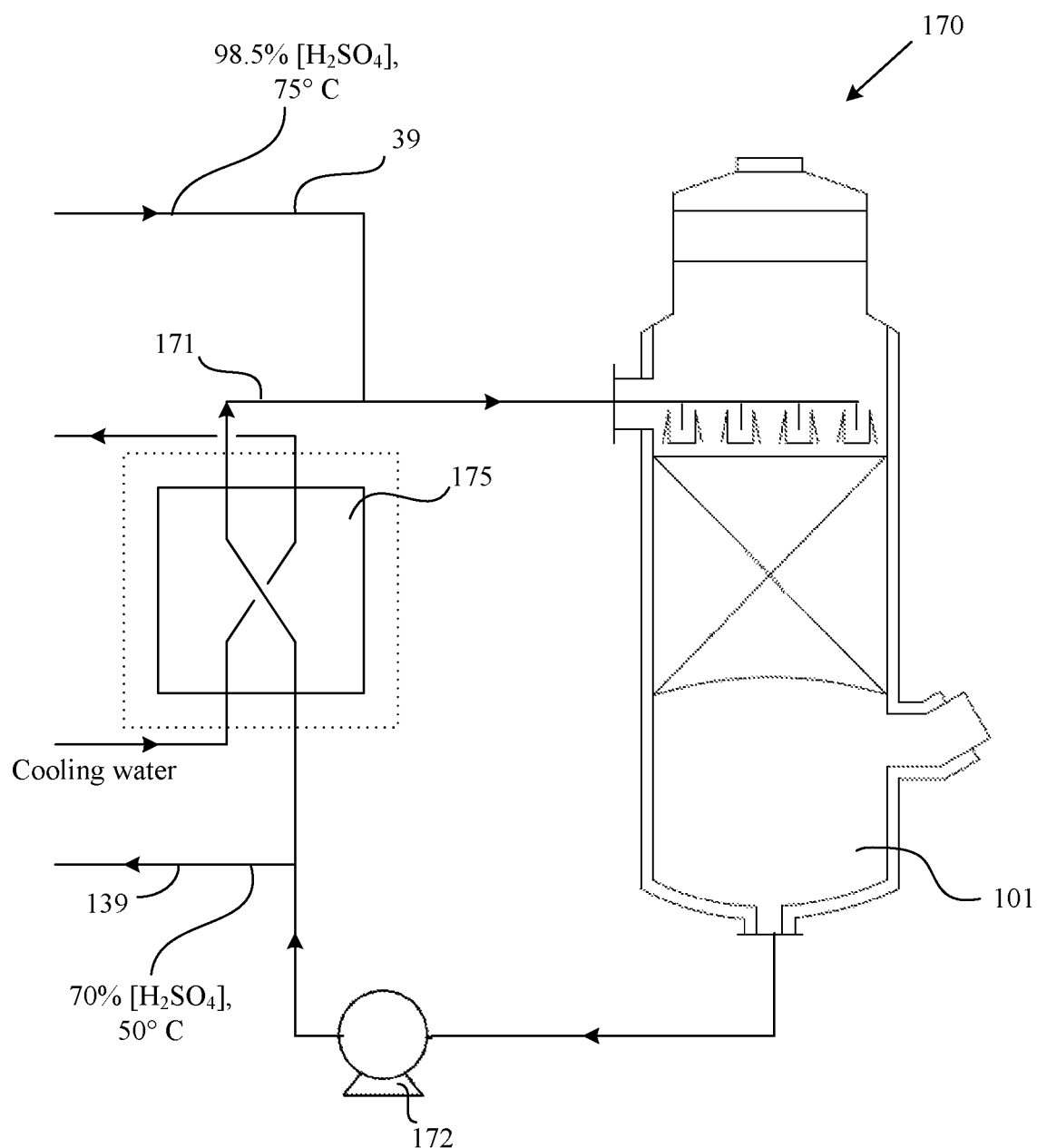
FIG. 8 shows a schematic of the pre-drying absorber portion of the liquid related circuit of the DCDA system of FIG. 5.

FIG. 8 shows a schematic of the pre-drying absorber portion of the liquid related circuit 170 of the DCDA system of FIG. 5. This portion of the liquid related circuit is new to the invention and is not present in the prior art liquid related circuit of the DCDA in FIGS. 2 and 3. Pre-drying absorber portion of the liquid related circuit 170 comprises pre-drying absorber 101 with liquid circuit 171 for circulating sulfuric acid within pre-drying absorber 101. Liquid circuit 171 comprises pump 172 and can optionally contain weak acid cooler 175 (shown within dashed lines) if some cooling of the circulating weak acid is desired. If employed, liquid circuit 171 is directed to the first liquid side of weak acid cooler 175 and cooling water is directed to the second liquid side of weak acid cooler 175. (As mentioned previously, due to the relatively low concentration and temperature of the acid used here, pre-drying absorber 101 and associated subsystem can advantageously be constructed using more cost effective materials, e.g. fibre-reinforced plastic, polypropylene, etc.)

Drying of incoming air can be accomplished using the arrangement shown in FIG. 8, without requiring expensive cooling systems, by carrying out the drying using dilute sulphuric acid at approximately 40-60 wt % concentration. By carefully selecting the concentration, the system can be operated with no cooling at all (as the condensation energy of the water is used to heat the air) or, optionally, some cooling can be provided to allow operation at even lower acid concentrations.

With the arrangement shown in FIGS. 5 to 8, excessive water in ambient air can be removed via absorption in weak sulfuric acid in pre-drying absorber 101. The still weak acid formed in this pre-drying step is then used as part of the dilution water supplied to the energy recovery subsystem shown in FIG. 7. The concentration difference between this weak acid and the acid in "hot" liquid circuit 52 is much larger than can be obtained in conventional systems and consequently steam production can be significantly improved. Further, control of "hot" liquid circuit 52 can be achieved independent of ambient conditions.

While the preceding description illustrates a desirable, exemplary DCDA embodiment of the invention, it will readily be apparent to those in the art that other configurations and operating conditions based on the present invention are possible. For instance, the acid concentrations and temperatures may be varied over certain ranges throughout the system, while still enjoying the benefits of the invention. Further, the invention is not limited merely to DCDA systems. For instance, the invention may be considered for use in other systems such as single contact, single absorption (SCSA) systems, which do not employ a catalyst bed for an additional conversion after the intermediate absorption nor a final absorption tower. Further, the invention may be considered for use in either SCSA or DCDA systems with other means of removing $SO_2$ such as regenerative scrubbing.

In a separate improvement, sulfuric acid systems like those discussed above, can comprise a simplified peroxide tail gas scrubber in order to reduce $SO_2$ emissions from the system. Peroxide tail gas scrubbers are increasingly preferred not only for reducing the $SO_2$ concentration in the exhausted tail gas, but also because it converts the $SO_2$ to sulfuric acid.

Figure 9A:
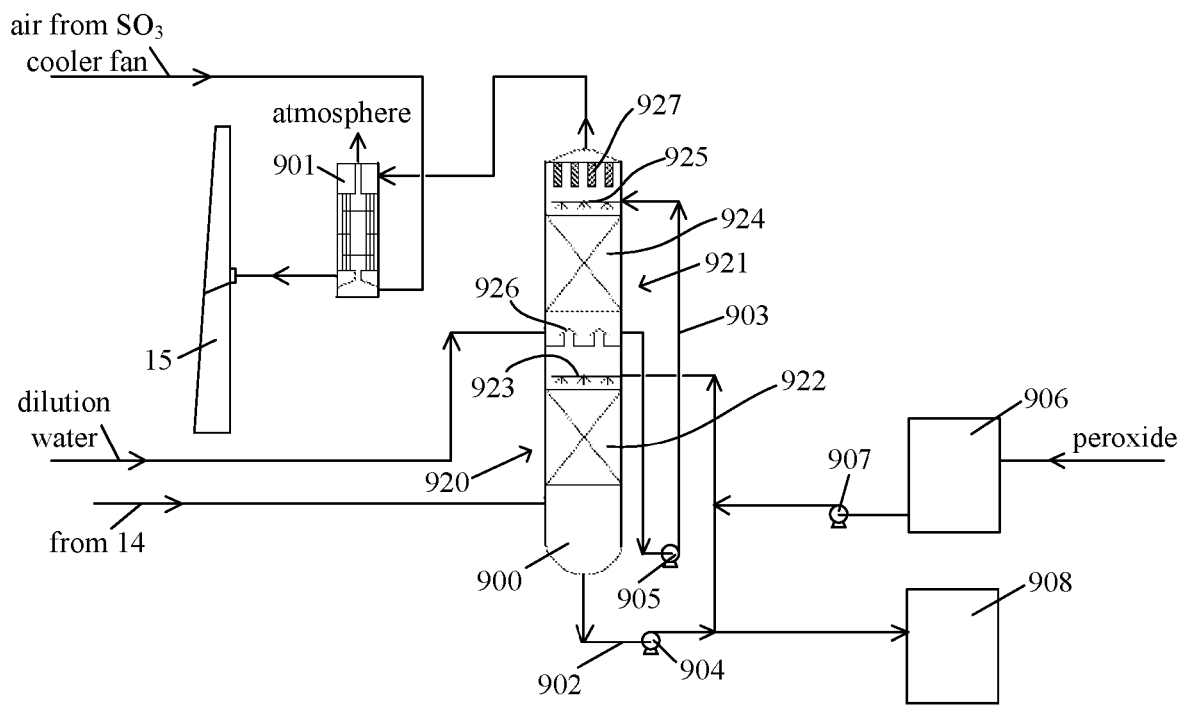
FIG. 9a shows a schematic of a prior art peroxide tail gas scrubber for the prior art DCDA system of FIG. 1.

A conventional prior art peroxide tail gas scrubber and its configuration in a DCDA system are illustrated in the schematic of FIG. 9a. Here, peroxide scrubber 900 is located between final $SO_3$ absorber 14 and stack 15 in order to "scrub" remaining $SO_2$ from the gas stream. Specifically, the gas outlet of final $SO_3$ absorber 14 connects to the gas inlet of peroxide scrubber 900. The gas outlet of peroxide scrubber 900 scrubber is connected to heat exchanger 901 and after cooling therein is directed to stack 15. Air from a $SO_3$ cooler fan (not shown) is used as the heat exchange fluid in heat exchanger 901 and is vented to atmosphere after cooling the gas stream in the system.

Peroxide scrubber 900 comprises two packed bed sections, namely lower packed bed scrubber section 920 and upper scrubber section 921 in which weak sulfuric acid solution containing peroxide and water respectively are used to "scrub" $SO_2$ from the gas stream. Lower packed bed section 920 comprises lower column packing 922 over which peroxide is distributed via peroxide scrubber distributor 923. In the prior art embodiment of FIG. 9a, upper scrubber section 921 is also a packed bed scrubber and comprises upper column packing 924 over which water is distributed via water scrubber distributor 925. Peroxide scrubber 900 also comprises separation plate 926 (which separates lower packed bed scrubber section 920 from upper scrubber section 921) and mist eliminators 927.

Weak acid solution is circulated within lower packed bed scrubber section 920 via peroxide circuit 902. Peroxide circuit 902 collects weak acid solution from the bottom of peroxide scrubber 900 and pumps it using peroxide pump 904 to peroxide scrubber distributor 923. In a like manner, water (or water containing trace sulfuric acid) is circulated within upper scrubber section 921 via water circuit 903. Water circuit 903 collects weak sulfuric acid solution above separation plate 926 and pumps it using water pump 905 to water scrubber distributor 925.

A supply of peroxide solution for peroxide scrubber 900 is stored in peroxide tank 906 and introduced as required by pumping into peroxide circuit 902 using peroxide pump 903. Dilution water is introduced as required by directing into peroxide scrubber 900 above separation plate 926. The water scrubber pump is a closed loop pumping circuit, i.e. liquid inventory is controlled by the overflow of liquid through the separation tray that separates the bottom and the upper packed section. Scrubbed $SO_2$ is removed by continuous withdrawal of a portion of the weak acid solution circulating in peroxide circuit 902. The removed weak acid solution can be temporarily stored in weak acid tank 908.

Figure 9B:
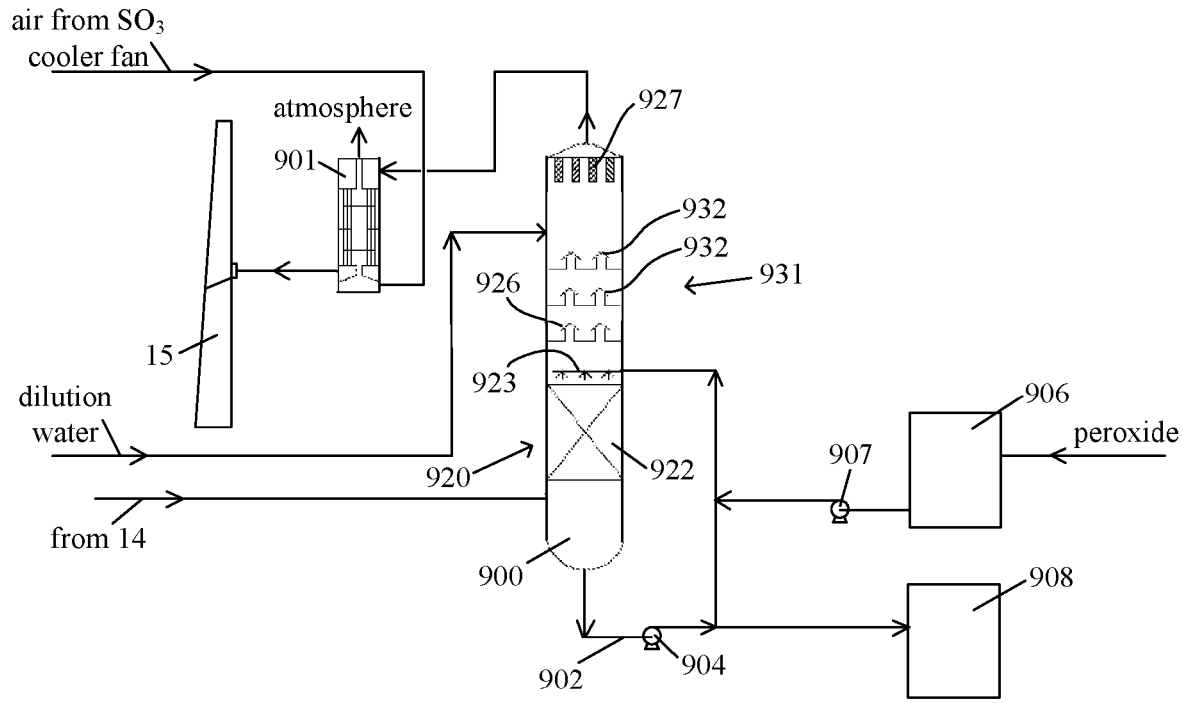
FIG. 9b shows a schematic of an improved peroxide tail gas scrubber for the DCDA systems of FIGS. 1 and/or 5.

FIG. 9b shows an improved peroxide tail gas scrubber and its configuration in an otherwise similar DCDA system. The improved peroxide tail gas scrubber also comprises a lower packed bed scrubber section and an upper scrubber section, but here the upper scrubber section consists essentially of tray type scrubbers. Specifically, upper scrubber section 931 has one or more tray type scrubbers 932 (two are shown in FIG. 9b) instead of a packed bed. Thus, the embodiment of FIG. 9b does not have upper column packing 924 nor water scrubber distributor 925. Further, as shown, dilution water is introduced above the uppermost of tray type scrubbers 932 instead of being introduced above separation plate 926. Thus, the embodiment of FIG. 9b also does not require hardware for water circuit 903 nor water pump 905 and thus represents a significant simplification of a peroxide tail gas scrubber for this application.

Appropriate tray type scrubbers 932 for use in the embodiment of FIG. 9b include bubble cap trays, tunnel trays, and other like tray type scrubbers known to those in the art. Such tray type scrubbers can simply and desirably be made of appropriate plastic plates.

The following Examples have been included to illustrate certain aspects of the invention but should not be construed as limiting in any way.

Examples

Calculations were carried out to compare the relative steam production as a function of ambient humidity which could be expected from several prior art embodiments of a DCDA sulfuric acid system to the steam production which could be expected from an inventive DCDA system. In all cases, the DCDA system comprised a converter comprising four contact catalyst beds and also incorporated a heat recovery system to produce steam from the energy available in the intermediate absorption. The gas stream from the furnace was assumed to contain 11.5% $SO_2$. The $O_2:SO_2$ ratio of the gas stream supplied to the converter was 0.83:1. Further, 95.5% conversion was assumed after third stage conversion in the third contact catalyst bed 3.95% of the $SO_3$ was assumed to be absorbed in the $1^{st}$ $SO_3$ absorber. These DCDA systems were also assumed to operate so as to produce 98.5% product sulfuric acid. And further, as in present commercial sulfuric acid plants, it was assumed that adjustments could be made via water addition and the like, that steam production could be kept constant from very low ambient humidity levels (i.e. 0% water by volume) up to about 1.45% (i.e. relative steam production was a constant value of 1 up to 1.45% water in the ambient air). Thereafter, steam production was assumed to be maximized using one of the methods in the prior art or using a method of the invention.

The following different DCDA systems were then considered and their relative steam production values calculated. The Comparative 1 system assumed a system like that illustrated in FIGS. 1 to 3 where a "crossflow" of 98.5% [$H_2SO_4$] was used, namely where the acid 39 supplied to $1^{st}$ $SO_3$ absorber 10 was 98.5% [$H_2SO_4$] and was obtained from common acid tank 34.

The Comparative 2 and Comparative 3 systems both assumed a system like that illustrated in FIG. 4 where crossflows of lower acid concentration were used, namely where the acid 39 supplied to $1^{st}$ $SO_3$ absorber 10 was obtained from separate drying absorber tank 34. In the Comparative 2 system, the concentration of acid 39 was assumed to be 96% [$H_2SO_4$]. In the Comparative 3 system, the concentration of acid 39 was assumed to be the lowest practical amount of 94% [$H_2SO_4$].

Next, the Comparative 4 system assumed a system with a gas bypass around $1^{st}$ $SO_3$ absorber 10 (i.e. where a partial stream of $SO_3$ is bypassed via bypass line 80 and controlled by control valve 81, as is optionally indicated in FIG. 1).

Finally, the Inventive system assumed a system having a pre-drying absorber 101 which was configured and operated as illustrated in FIGS. 5 to 8 in accordance with the invention. The acid 139 supplied to $1^{st}$ $SO_3$ absorber 10 was now obtained from pre-drying absorber 101 and was 70% [$H_2SO_4$].

Figure 10:
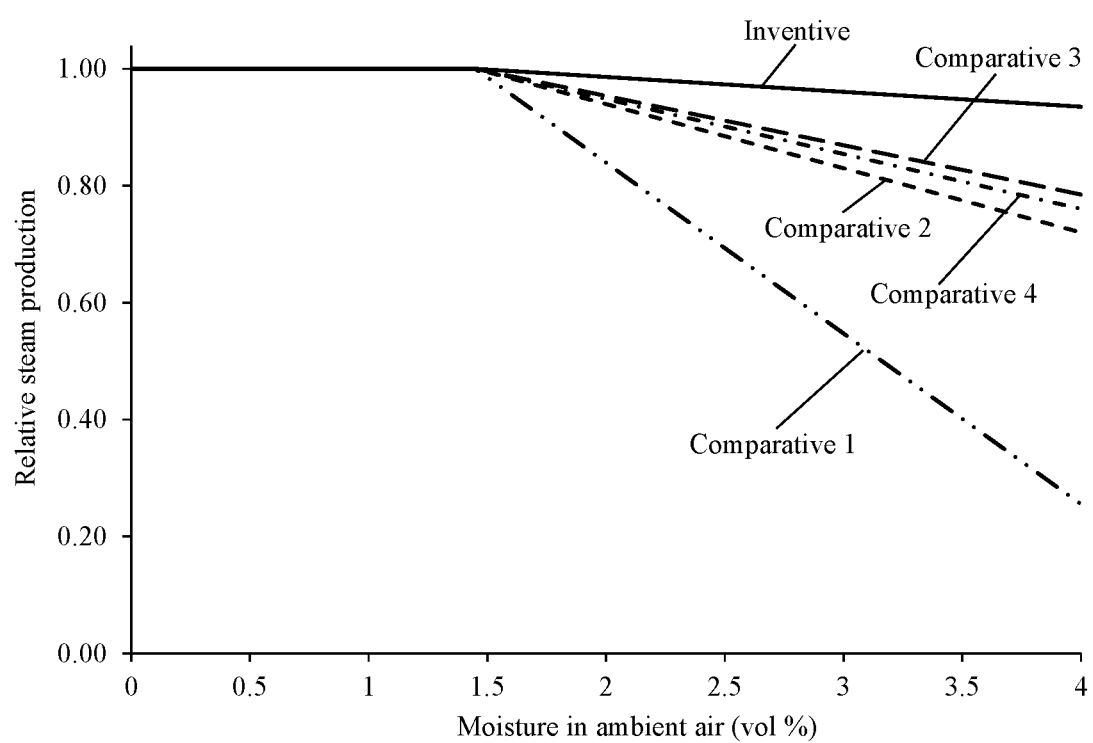
FIG. 10 compares the calculated plot of relative steam production versus ambient moisture level for the inventive DCDA system to plots for the various prior art DCDA systems modelled in the Examples.

FIG. 10 compares the calculated plots of relative steam production versus ambient moisture level for all the systems considered. As mentioned above, in all cases, it was assumed that adjustments could keep the relative steam production at a constant value of 1 up to 1.45% water. Above that however, steam production and efficiency began to suffer. Relative steam production fell off most dramatically for the Comparative 1 system. The Comparative 2 and Comparative 3 systems were better, with the Comparative 3 system being noticeably better than the Comparative 2 system as might be expected. The Comparative 4 system results were close to, but somewhat less, than those achieved with the Comparative 3 system. The Inventive system however showed a marked improvement over all the Comparative systems. Relative steam production values greater than 0.9 were maintained for moisture levels up to 4% water. The present invention would thus appear to allow for substantially better heat recovery than other systems and methods of the prior art.

All of the above U.S. patents, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. A contact process, sulfuric acid system for producing sulfuric acid from sulfur comprising:
   a pre-drying absorber comprising a gas inlet connected to ambient air, a gas outlet, a liquid inlet, and a liquid outlet;
   a drying absorber comprising a gas inlet connected to the gas outlet of the pre-drying absorber, a gas outlet, a liquid inlet, and a liquid outlet;
   a sulfur furnace comprising a gas inlet connected to the gas outlet of the drying absorber, and a gas outlet;
   a sulfur dioxide-to-sulfur trioxide converter comprising a series of contact catalyst beds, a gas inlet connected to the gas outlet of the sulfur furnace, and a gas outlet; and
   a two-stage sulfur trioxide absorption subsystem comprising a $1^{st}$ sulfur trioxide absorber, a $2^{nd}$ sulfur trioxide absorber, and a heat exchanger, wherein:
      the $1^{st}$ sulfur trioxide absorber comprises a gas inlet connected to the gas outlet of the converter, a gas outlet, a liquid inlet, a liquid outlet for product sulfuric acid, and a liquid circuit for circulating sulfuric acid within the 1$^{st}$ absorber;

the 2$^{rd}$ sulfur trioxide absorber comprises a gas inlet connected to the gas outlet of the sulfur trioxide absorber, a gas outlet, a liquid inlet, a liquid outlet for product sulfuric acid and a liquid circuit for circulating sulfuric acid within the 2$^{nd}$ absorber; and the heat exchanger comprises a first liquid side and a 2$^{nd}$ liquid side in thermal contact with each other, wherein the first liquid side is connected in series within the liquid circuit of the 1$^{st}$ sulfur trioxide absorber, and the second liquid side comprises an inlet connected to a supply of feed water in the sulfuric acid system and an outlet for steam; and wherein the liquid inlet of the 1$^{st}$ sulfur trioxide absorber is connected to the liquid outlet of the pre-drying absorber.

2. The sulfuric acid system of claim 1 wherein the liquid inlet of the pre-drying absorber is connected to a supply of sulfuric acid.

3. The sulfuric acid system of claim 2 wherein the liquid inlet of the pre-drying absorber is connected to a supply of product sulfuric acid from the 2$^{rd}$ sulfur trioxide absorber.

4. The sulfuric acid system of claim 1 wherein the pre-drying absorber is a packed bed absorption tower.

5. The sulfuric acid system of claim 1 wherein the 1$^{st}$ sulfur trioxide absorber is selected from the group consisting of an open spray tower, a venturi absorber, and a packed bed absorption tower.

6. The sulfuric acid system of claim 1 wherein the 2$^{nd}$ sulfur trioxide absorber is a packed bed absorption tower.

7. The sulfuric acid system of claim 3 comprising a common acid tank wherein the liquid outlet for product sulfuric acid from the 1$^{st}$ sulfur trioxide absorber is connected to a 1$^{st}$ inlet in the common acid tank, the liquid outlet for product sulfuric acid from the 2$^{rd}$ sulfur trioxide absorber is connected to a 2$^{nd}$ inlet in the common acid tank, the liquid outlet from the drying absorber is connected to a 3$^{rd}$ inlet in the common acid tank, and the liquid inlet of the pre-drying absorber is connected to an outlet in the common acid tank.

8. The sulfuric acid system of claim 1 wherein the liquid inlet of the 1$^{st}$ sulfur trioxide absorber is additionally connected to a supply of dilution water.

9. The sulfuric acid system of claim 1 comprising an additional contact catalyst bed and an additional sulfur trioxide absorber.

10. The sulfuric acid system of claim 1 comprising a peroxide tail gas scrubber comprising a lower packed bed scrubber section and an upper scrubber section wherein the upper scrubber section consists essentially of tray type scrubbers.

11. A method for energy efficient production of sulfuric acid using the sulfuric acid system of claim 1 comprising:

pre-drying ambient air in the pre-drying absorber with weak sulfuric acid having a concentration of less than 90% by weight;

drying the pre-dried ambient air in the drying absorber with sulfuric acid;

oxidizing sulfur with the dried, pre-dried ambient air in the sulfur furnace, thereby producing a gas stream comprising sulfur dioxide;

converting the sulfur dioxide in the gas stream to sulfur trioxide in the converter;

providing the weak sulfuric acid from the pre-drying absorber to the liquid inlet of the 1$^{st}$ sulfur trioxide absorber, thereby diluting sulfuric acid in the 1$^{st}$ sulfur trioxide absorber with the provided weak sulfuric acid;

absorbing sulfur trioxide from the gas stream from the converter in sulfuric acid in the sulfur trioxide absorber, thereby producing heated product sulfuric acid;

exchanging heat from the heated product sulfuric acid in the first liquid side of the heat exchanger to feed water supplied to the inlet of the second liquid side of the heat exchanger, thereby producing steam;

absorbing sulfur trioxide remaining in the gas stream from the 1$^{st}$ sulfur trioxide absorber in the 2$^{rd}$ sulfur trioxide absorber, thereby producing product sulfuric acid; and exhausting the gas stream from the sulfuric acid system.

12. The method of claim 11 wherein the water concentration in the ambient air is greater than 1.0 vol %.

13. The method of claim 12 wherein the water concentration in the ambient air is greater than 1.5 vol %.

14. The method of claim 11 wherein the weak sulfuric acid in the pre-drying absorber has a concentration of less than or about 70%.

15. The method of claim 11 wherein the temperature of the weak sulfuric acid in the pre-drying absorber is less than about 70° C.

16. The method of claim 15 wherein the temperature of the weak sulfuric acid in the pre-drying absorber is about 50° C.

17. The method of claim 11 comprising providing sulfuric acid having a concentration of greater than 93% to the pre-drying absorber.

18. The method of claim 11 wherein the concentration of heated product sulfuric acid in the 1$^{st}$ sulfur trioxide absorber and the concentration of the product sulfuric acid in the 2$^{rd}$ sulfur trioxide absorber are both greater than 98%.

19. The method of claim 18 wherein heated product sulfuric acid from the 1$^{st}$ sulfur trioxide absorber and product sulfuric acid from the 2$^{rd}$ sulfur trioxide absorber are directed to a common acid tank.

20. The method of claim 19 wherein the sulfuric acid in the common acid tank has a concentration of greater than 98%.

21. The method of claim 11 wherein the relative steam production in the sulfuric acid system is increased by from about 5 to 30%.

* * * * *

UNITED STATES PATENT AND TRADEMARK OFFICE
CERTIFICATE OF CORRECTION

PATENT NO. : 10,532,929 B2
APPLICATION NO. : 16/098818
DATED : January 14, 2020
INVENTOR(S) : Rene Dijkstra et al.

Page 1 of 1

It is certified that error appears in the above-identified patent and that said Letters Patent is hereby corrected as shown below:

On the Title Page

Item (71) Applicant:
"Chemetics Inc., Vancouver (CA)" should read --Chemetics Inc., Vancouver, BC (CA)--.

In the Claims

Column 15, Claim 1, Lines 5-6:
"connected to the gas outlet of the sulfur trioxide absorber" should read --connected to the gas outlet of the 1st sulfur trioxide absorber--.

Column 16, Claim 11, Line 16:
"converter in sulfuric acid in the sulfur trioxide absorber" should read --converter in sulfuric acid in the 1st sulfur trioxide absorber--.

Signed and Sealed this
First Day of September, 2020

Andrei Iancu
*Director of the United States Patent and Trademark Office*